(12) United States Patent
Crompton et al.

(10) Patent No.: US 8,567,446 B1
(45) Date of Patent: Oct. 29, 2013

(54) FLOW CHECK VALVE ASSEMBLY AND METHOD

(71) Applicant: Quick Fitting, Inc., Warwick, RI (US)

(72) Inventors: David B. Crompton, Tiverton, RI (US); Libardo Ochoa Dias, Pawtucket, RI (US)

(73) Assignee: Quick Fitting, Inc., Warwick, RI (US)

( * ) Notice: Subject to any disclaimer, the term of this patent is extended or adjusted under 35 U.S.C. 154(b) by 0 days.

(21) Appl. No.: 13/756,716

(22) Filed: Feb. 1, 2013

(51) Int. Cl.
*F15D 1/04* (2006.01)

(52) U.S. Cl.
USPC ............ 138/44; 138/45; 138/46; 138/114; 285/123.3

(58) Field of Classification Search
USPC ......... 138/44–46, 114; 285/123.1, 123.3, 302
See application file for complete search history.

(56) References Cited

U.S. PATENT DOCUMENTS

| | | | | |
|---|---|---|---|---|
| 3,805,824 A | * | 4/1974 | Robbins, Jr. | 137/504 |
| 4,009,592 A | * | 3/1977 | Boerger | 62/222 |
| 4,067,361 A | * | 1/1978 | Hollister et al. | 138/42 |
| 4,383,552 A | * | 5/1983 | Baker | 138/46 |
| 4,867,198 A | * | 9/1989 | Faust | 137/503 |
| 5,010,740 A | * | 4/1991 | Backus et al. | 62/217 |
| 5,996,632 A | * | 12/1999 | Vogel et al. | 138/31 |
| 6,536,470 B1 | * | 3/2003 | Carn et al. | 137/554 |

* cited by examiner

*Primary Examiner* — Patrick F Brinson
(74) *Attorney, Agent, or Firm* — Williams Mullen PC; Thomas F. Bergert

(57) ABSTRACT

The present invention provides, in part, a valve assembly and method that maintains balance of flow to pressure in fluid and gas piping system applications. In one embodiment, the present invention includes a main body component adapted to retain a chamber body component, a fluid control plate and seal, and a chamber cap. The chamber body component is slidably maintained within the main body component. A resilient gland member is securably attachable to one end of the main body component and the chamber body component, and acts as a seal and a memory for returning the chamber body component to a standard operating position upon fluid pressure environment shifting the chamber body component towards a shut off position.

20 Claims, 7 Drawing Sheets

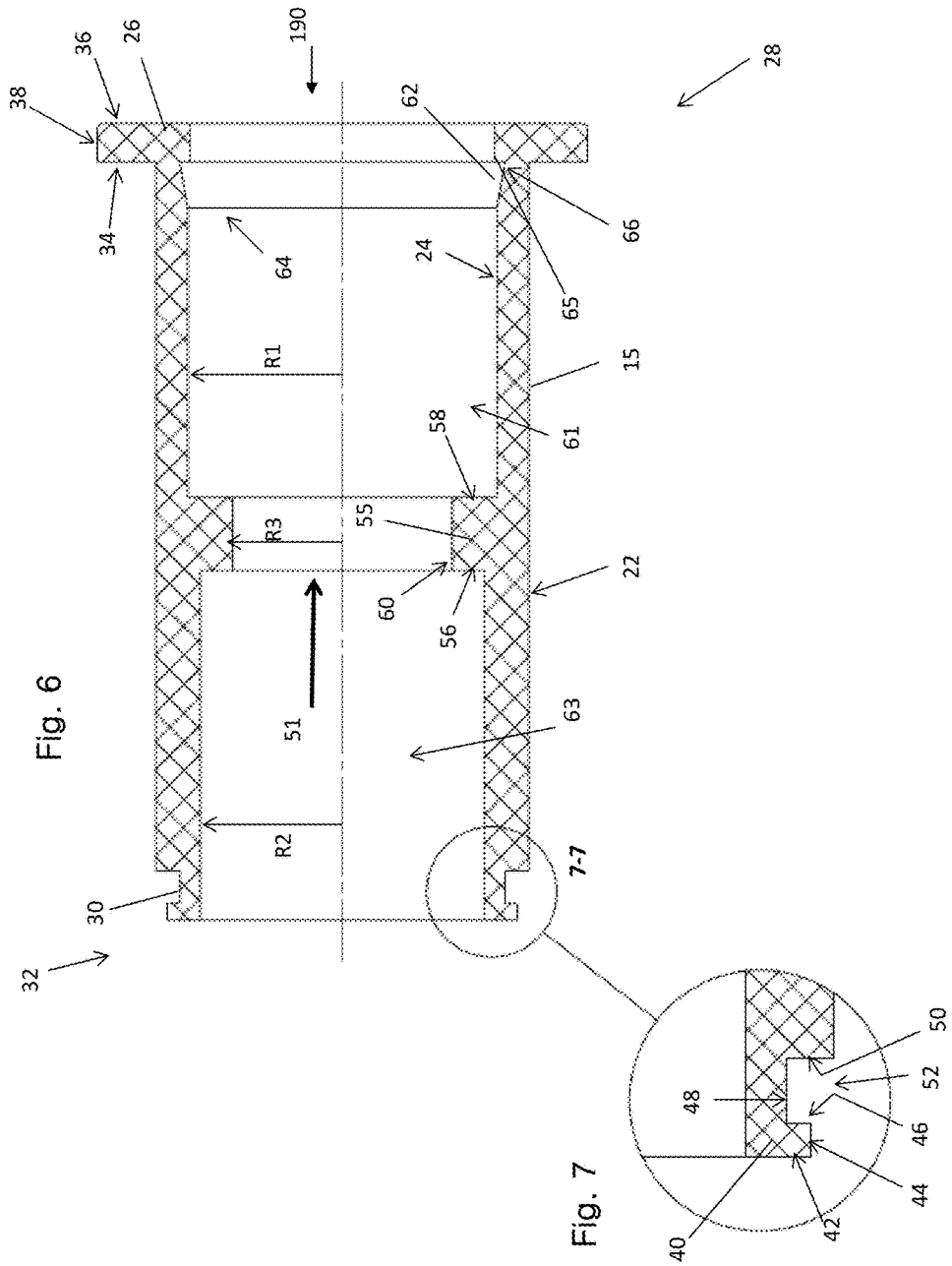

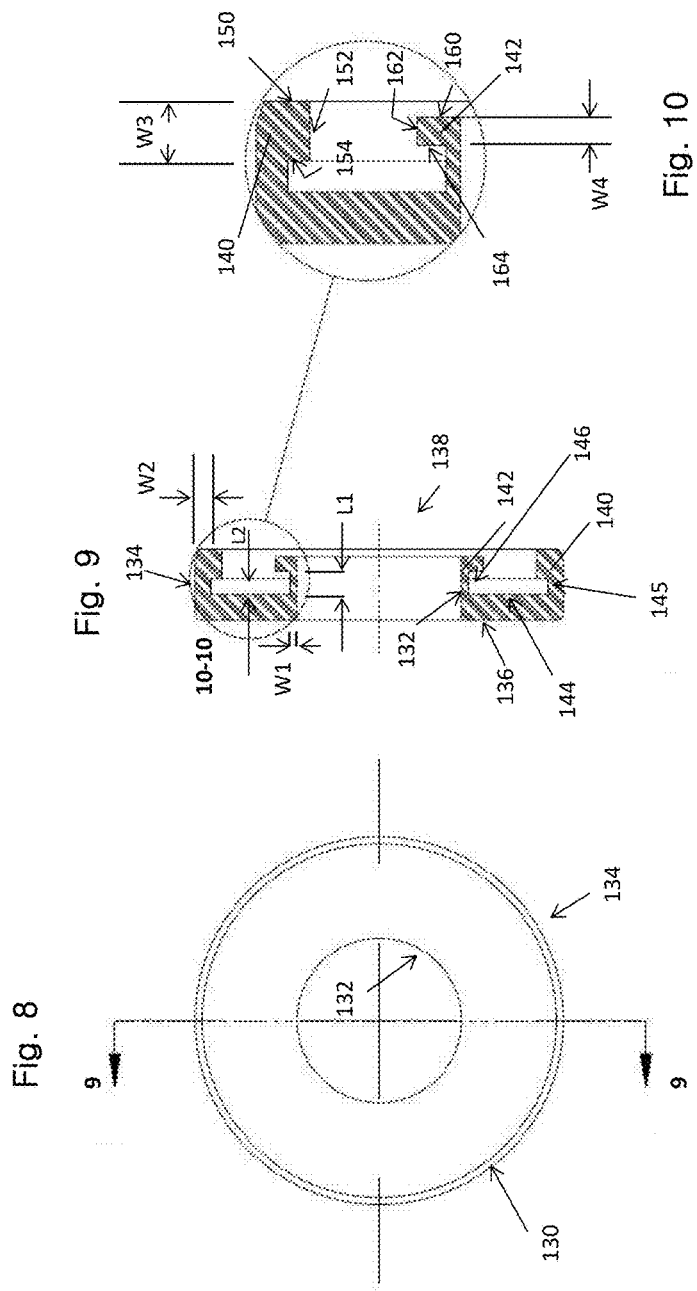

FLOW CHECK VALVE ASSEMBLY AND METHOD

FIELD OF THE INVENTION

The present invention relates to fluid flow systems, and more particularly to a check valve assembly that regulates fluid flow rate and enhances stoppage and re-starting of fluid flow in piping systems.

BACKGROUND OF THE PRESENT INVENTION

Piping systems exist to facilitate the flow of fluids (e.g., liquid, gas (such as air) or plasma). For example, homes, schools, medical facilities, commercial buildings and other occupied structures generally require integrated piping systems so that water and/or other fluids can be circulated for a variety of uses. Liquids and/or gases such as cold and hot water, breathable air, glycol, compressed air, inert gases, natural gases, cleaning chemicals, waste water, plant cooling water and paint and coatings are just some examples of the types of fluids and gases that can be deployed through piping systems. Tubing/piping types can include, for example, copper, stainless steel, CPVC (chlorinated polyvinyl chloride) and PEX (cross-linked polyethylene). For purposes of the present disclosure, the term "pipe" or "piping" will be understood to encompass one or more pipes, tubes, piping elements and/or tubing elements.

Piping connections are necessary to join various pieces of pipe and must be versatile in order to adapt to changes of pipe direction, fluid types and fluid flow rates required in particular piping system implementations. For example, fittings and valves may be employed at the ends of open pieces of pipe that enable two pieces of pipe to fit together in a particular configuration. Among fitting types there are elbows, "tees", couplings adapted for various purposes such as pipe size changes, ends, ball valves, stop valves, check valves and partial angle connectors, for example.

Valves have different purposes depending upon the application. Washing machines, heaters, sinks, ice makers and other home and commercial appliances typically operate with fluid flow valves in order to regulate fluid flow operations and prevent damage. For example, if a washing machine hose bursts, it can discharge hundreds of gallons of water in an hour or less, and cause catastrophic damage as a result. A flow check valve or stop valve can be provided on the washing machine and can include a sensor to sense the water flow and automatically shut the water off if a hose bursts, for example.

Check valves are provided with two ports—one that allows fluid to enter and one that allows fluid to leave. Check valves operate to allow fluid to flow in one direction only through the valve. Flow check valves operate to monitor and maintain the flow rate of fluid through the valve, regardless of the inbound pressure. In any piping system, maintaining the balance of fluid flow to fluid pressure is paramount. The present invention provides a flow check valve that maintains the balance of fluid flow to fluid pressure in a manner that avoids leaks, flooding and other valve problems in the event of downstream system failure.

SUMMARY OF THE PRESENT INVENTION

The present invention provides, in part, a valve assembly and method that maintains balance of flow to pressure in fluid and gas piping system applications. In one embodiment, the present invention includes a main body component adapted to retain a chamber body component, a fluid control plate and seal, and a chamber cap. The chamber body component is slidably maintained within the main body component. A resilient gland member is securably attachable to one end of the main body component and the chamber body component, and acts as a seal and a memory for returning the chamber body component to a standard operating position upon fluid pressure environment shifting the chamber body component towards a shut off position.

As a flow check valve, the present invention is not necessarily concerned with preventing water or fluid from flowing back into the system. In one embodiment, the flow check plate (also known as a restrictor plate) of the present invention is secured to the flood stop control seal, which acts as a valve. The valve is biased in the open position and is set to allow certain flow (e.g., 2.5 gallons per minute) via the restrictor plate. The valve and plate are unaffected by the fluid pressure, but react to variations in the fluid flow. The remainder of the device acts as a regulator in order to maintain the balance of flow to pressure. For example, if pressure goes from 35 psi (pounds per square inch) to 80 psi within the device, the chamber body component (a.k.a., the piston) will be pushed towards the flood stop control seal and the gland member will be stretched. The chamber body front end will eventually engage the flood stop control seal, at which time the overflow ports of the chamber body member will be inside an interior chamber of the device exposed to a positive displacement area formed between the main body component and the chamber body component. Further, the fluid diverted through the overflow ports will stay in this interior chamber and act to retain the piston in the engaged position preventing water flow through or past the valve. When the pressure subsides, the gland member is then strong enough and has sufficient retention connections with the main body component and chamber body component to retract and bring the piston back, allowing fluid flow past the valve and releasing the check. The overflow ports are then re-positioned back in the second portion of the main body chamber exposed to an area between the main body component's rampart member and the chamber cap.

In one embodiment of the present invention, the valve assembly of the present invention can be inserted into existing piping or tubing systems as a retrofit device.

BRIEF DESCRIPTION OF THE DRAWINGS

FIG. 6 is a front view in cross-section of one embodiment of the main body member of the present invention.

FIG. 7 is a breakout view of encircled portion 7-7 of FIG. 6.

FIG. 8 is a top plan view of a gland member in accordance with one embodiment of the present invention.

FIG. 9 is a cross-sectional view of the embodiment of the gland member taken along line 9-9 of FIG. 4.

FIG. 10 is a breakout view of encircled portion 10-10 of FIG. 9.

DETAILED DESCRIPTION OF THE PREFERRED EMBODIMENTS

As shown in FIGS. 1-11, the valve assembly 10 of the present invention includes a main body component 15 and a chamber body component 20. It will be appreciated that the assembly of the present invention is provided so as to be inserted, affixed and/or installed within a piping or tubing component (not shown).

The main body component 15 and chamber body component 20 are substantially cylindrical bodies with fluid passageways extending axially therethrough, and these components are axially aligned when engaged in accordance with the present invention. In one embodiment of the present invention, main body component 15 and chamber body component 20 are made of brass. In another embodiment of the present invention, one or both of these components may consist of copper or nylon, or other suitable material for the purposes undertaken in accordance with the present invention.

Figure 2:
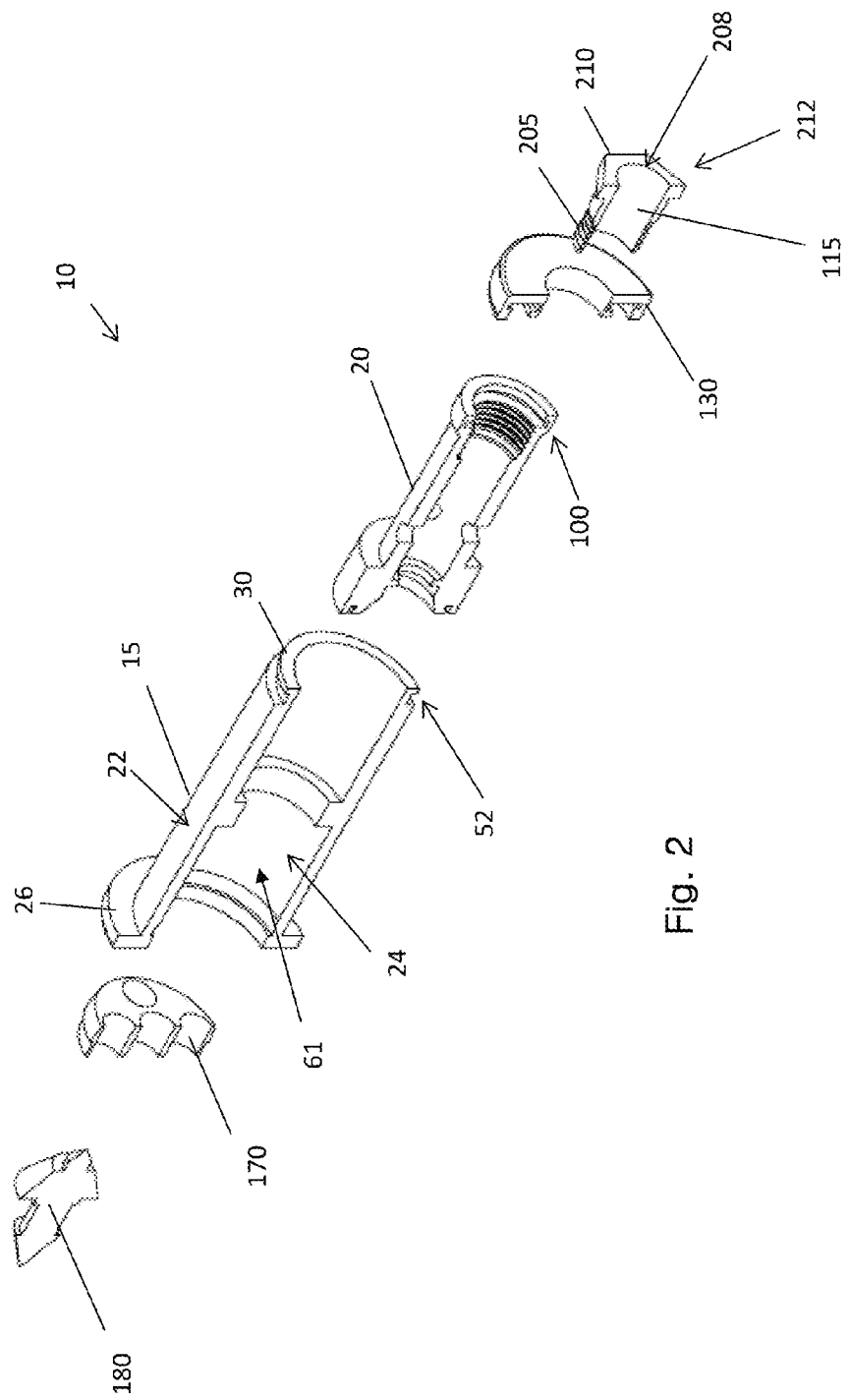
FIG. 2 is an exploded front perspective view of one embodiment of the valve assembly of the present invention, with components shown in cross-section.

As shown in FIGS. 2, 6 and 7, the main body component 15 includes an outer wall 22 and an inner wall 24. Together, the inner wall 24 and outer wall 22 comprise an integrated wall. The outer wall 22 of main body component 15 is capable of securely engaging the inner wall of a piping or tubing component.

The outer wall 22 extends from a cap edge portion 26 at a first axial end 28 of the main body component 15 to a grooved edge portion 30 at a second axial end 32 of the main body component 15. The cap edge 26 is a machined lip extending radially outwardly of the outer wall 22 of the main body component and includes a pipe or tube facing internal face 34, an outer face 36 and an outer edge 38. As shown in FIGS. 6-7, the grooved edge portion 30 is formed so as to provide a radially outwardly extending retaining edge 40 having a pipe or tube facing external face 42, an outer edge 44 and an inner face 46. The grooved edge portion 30 further includes an outer wall 48 and a body portion side wall 50, such that the body portion side wall 50, the outer wall 48 and the inner face 46 of the retaining edge 40 form an annular groove 52 extending circumferentially around the main body component 15. The annular groove 52 receives an exterior lip of a gland member as described hereafter.

Figure 11:
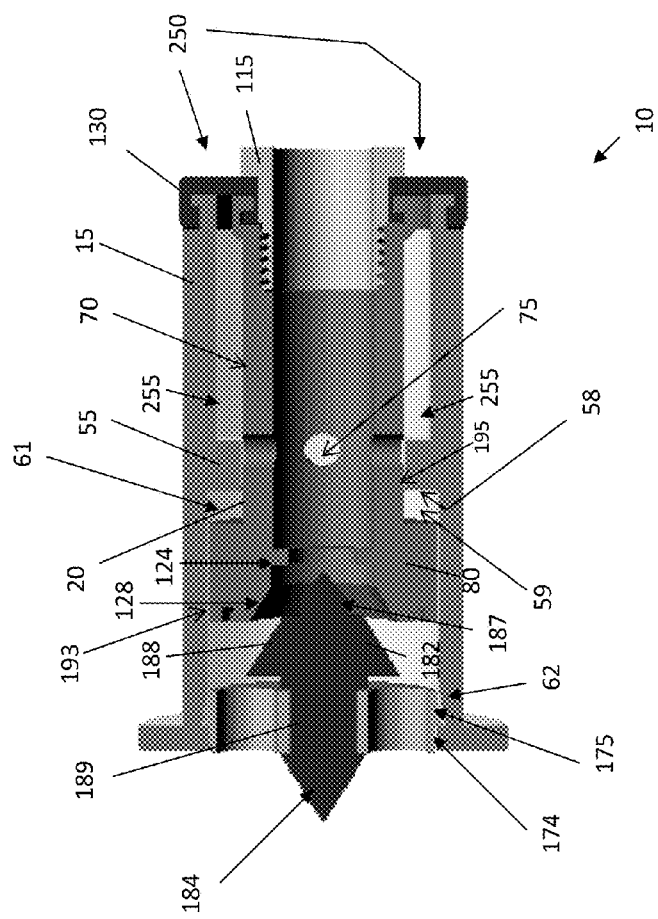
FIG. 11 is a front perspective view of the cross-section of the valve assembly in accordance with one embodiment of the present invention.

The inner wall 24 of the main body component 15 includes a radially inwardly extending rampart member 55 having a first side wall 56, a second side wall 58 and an interior edge 60. The rampart member 55 assists in providing a channel 51 and a physical resistance structure employed by the chamber body 20 and further assists in establishing a positive displacement area during operation of the present invention as will be described hereinafter. In one embodiment of the present invention, as shown in FIG. 11, the rampart member second side wall 58 cooperates with the chamber body member 20 to form a positive displacement cavity 59.

The interior edge 60 is capable of slidingly engaging the chamber body component 20 during operation of the present invention, as described in more detail hereafter. In one embodiment of the present invention, the inner wall 24 includes a tapered surface element 62 at the first axial end 28 of the main body component 15. As shown in FIG. 2, the tapered surface element 62 begins at a taper point 64 extending circumferentially around the inner wall 24 and ends at a position 66 under an interior lip 65 of the cap edge 26. In this way, the tapered surface element 62 and the cap edge interior lip 65 can engage a fluid control plate as described in more detail hereafter.

Figure 3:
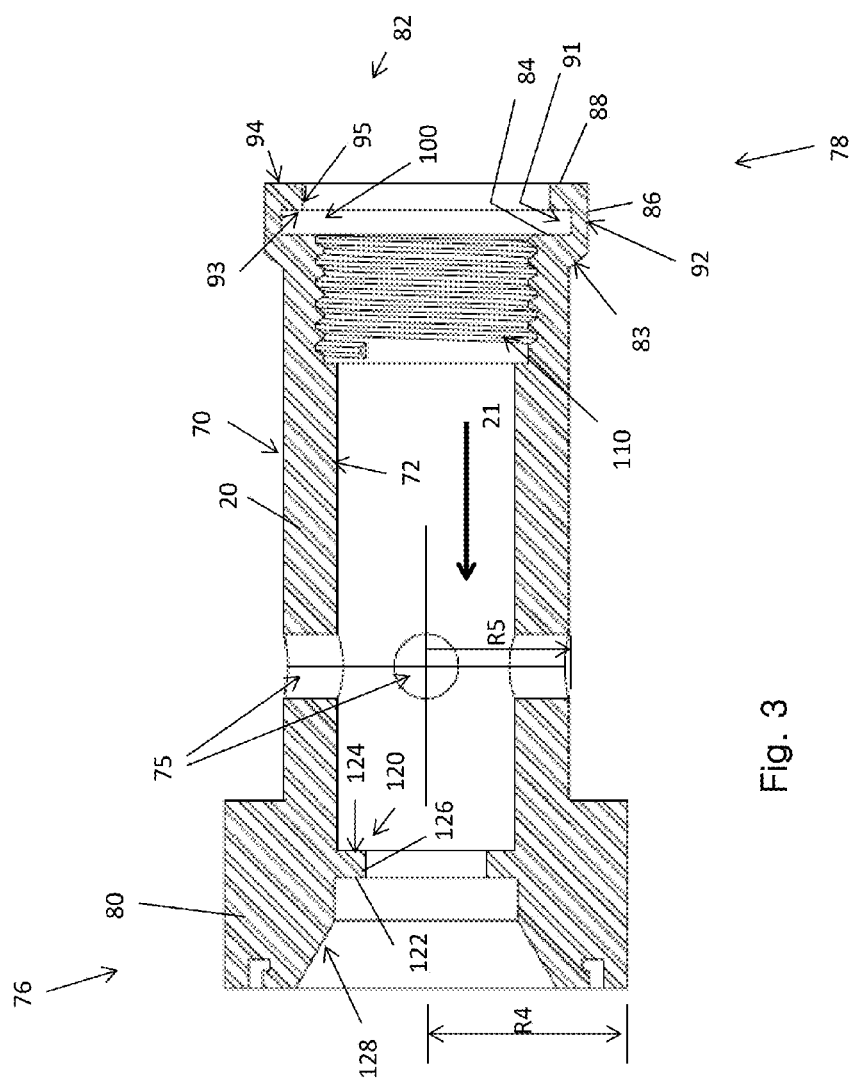
FIG. 3 is a front cross-sectional view of the chamber body component in accordance with one embodiment of the present invention.

As shown in FIGS. 2 and 3, the chamber body component 20 includes an outer wall 70 and an inner wall 72, together comprising an integrated wall, with the outer wall 70 capable of slidingly engaging the interior edge 60 of the rampart member 55 of main body component 15. In this way, the chamber body component 20 is not permitted to veer off its axial course during operation, and space is provided appropriately between the outer wall 70 of the chamber body component 20 on both sides of the rampart member 55 of the main body component to permit fluid flow, as shown in FIG. 11. The chamber body component 20 can take the form of a substantially cylindrical body element having a channel or cavity 21 therethrough to permit axial flow of fluids.

The chamber body component 20 is also formed to include one or more propulsion ports 75 in order to permit fluid to flow in and out of the cavity of the chamber body component during operation. In one embodiment of the present invention, the propulsion ports 75 are positioned so as to function only upon saturation of the flow area, as will be described in more detail hereafter. The outer wall 70 of the chamber body component 20 extends from a first axial end 76 to a second axial end 78. The chamber body component 20 is formed to include a chamber body head member 80 extending radially outwardly from the outer wall 70 proximate the first axial end 76 and a gland engaging end 82 extending radially outwardly from the outer wall 70 proximate the second axial end 78. As shown in the embodiment of FIG. 3, the head member 80 extends substantially perpendicularly from the outer wall 70 while the gland engaging end 82 extends as indicated at 83 at an acute angle from the outer wall. It will be appreciated that, while the present invention contemplates other embodiments wherein such extension angles differ from that shown in FIG. 3, the angles shown in FIG. 3 assist in structurally supporting the chamber body component 20 within the overall device of the present invention during operation. As shown in FIG. 3, the gland engaging end 82 includes an external body wall 84, an outer radial wall 86 and an outer axial wall 88. The outer radial wall 86 includes an inner face 91 and an outer face 92, and the outer axial wall 88 includes an inner face 93, an outer face 94 and a radial internal edge 95. An annular groove 100 is formed by the outer radial wall inner face 91, the outer axial wall inner face 93 and the first external body wall 84 of the chamber body component 20. The annular groove 100 receives an interior lip of a gland member as described hereafter.

In one embodiment of the present invention, the radius R1 of the first portion 61 of the main body component chamber that houses the chamber body head member 80 is greater than the radius R2 of the second portion 63 of the main body component chamber. This arrangement assists in creating the desired fluid pressure differential between that occurring near the fluid outbound area (i.e., the area around where plate 170 is located) and that occurring near the fluid inbound area (i.e., from the area where gland 130 is located). Additionally, in one embodiment of the present invention, the chamber body head member 80 has a radius R4 that is slightly less than the radius R1 of the first portion 61 of the main body component chamber, and the chamber body component 20 radius R5 (to outer wall 70, shown in FIG. 3) is slightly less than the internal radius R3 of the rampart member 55 within main body component 15. In one embodiment, the relationship of the respective radii can be such that the chamber body head member radius R4 is from 0.002 to 0.015 inches less than the radius R1 of the first portion 61 of the main body component chamber, inclusive, and chamber body component radius R5 is similarly from 0.002 to 0.015 inches less than the radius R3 of the rampart member 55. At the 0.002 inch difference, the maximum amount of tolerable friction occurs. If the distance exceeds the 0.015 inch difference, the chamber body head member 80 and component 20 may not slide evenly within the main body component chamber 61 and within the area encircled by the rampart member 55, respectively. As such, there may not be enough balancing pressure or back pressure to support proper operation of the components of the present invention.

As shown in FIGS. 2 and 3, the annular groove 52 within the main body component 15 faces radially outwardly while the annular groove 100 within the chamber body component 20 faces radially inwardly. This arrangement permits the present device to securely engage the gland member described below while maintaining substantially coaxial and parallel alignment of the main body component and chamber body component. Such an arrangement and positioning assists the present device during operation such that fluids and gases do not escape or infiltrate the present invention components as an unintended consequence.

As shown in FIGS. 1-5, the inner wall 72 of the chamber body component 20 is provided with a thread 110 proximate the second axial end 78 for receiving an end cap 115 as described hereafter. The inner wall 72 further extends through the chamber body head member 80, extending radially inwardly to form an interior ring 120 having a first side wall 122, a second side wall 124 and a radially inward edge 126. A bevel wall 128 extends from the inner wall 72 at a position adjacent the first side wall 122 of the interior ring 120, and the bevel wall 128 is angled so as to cooperatively engage a control seal during operation of the present invention, as described hereafter.

The gland member 130 of the present invention is shown in FIGS. 1-2 and 8-10. As shown therein, the gland member 130 comprises a unitary, substantially rigid yet somewhat flexible element that acts as both a sealing member and a spring or pressure-balancing member for the device of the present invention. The gland member 130 is a hollow, ring-shaped device having a radially outer wall 132, a radially inner wall 134 and an exterior wall 136. The gland member 130 further is formed with an interior face 138 having a substantially C-shaped cross-section with exterior 140 and interior 142 lip elements. As shown in FIG. 10, the exterior lip 140 includes a front wall 150, a radially inward wall 152 and an interior wall 154, and the interior lip 142 includes a front wall 160, a radially inward wall 162 and an interior wall 164. Further, each of the gland member exterior wall 136, radially outer wall 132 and radially inner wall 134 includes a respective inner surface 144, 145, 146, whereby the respective inner surfaces 144, 145, 146 and the lip members 140, 142 cooperatively engage the annular grooves 52, 100 of the main body component 15 and the chamber body component 20, respectively.

In one embodiment of the present invention, as shown in FIG. 10, the front wall 150 of the exterior lip 140 extends further outwardly than the front wall 160 of the interior lip 142, and the interior wall 154 of the exterior lip 140 extends further inwardly than the interior wall 165 of the interior lip 142. Such an arrangement provides the exterior lip 140 with greater surface area and thereby greater strength of connection with main body component than the interior lip 142 enjoys with the chamber body component 20. Further, as shown in the embodiment of the present invention shown in FIG. 10, the radially outer wall 132 of the gland member is thicker in width and shorter in length than the radially inner wall 134. As a result, the interior lip 142 has a modest amount of additional flexibility to thereby operate as intended, by permitting the chamber body component 20 to move axially within the main body component chamber. In one embodiment of the present invention, as shown in FIG. 9, the length L1 of the radially inner wall 132 can range from approximately 125% to approximately 167% the length L2 of the radially outer wall 134, and the width W1 of the radially inner wall 132 can range from approximately 20% to approximately 40% the width W2 of the radially outer wall 134. In a further embodiment of the present invention, the width W3 of the exterior lip radially inward wall 152 is approximately 175% to approximately 300% the width W4 of the interior lip radially inward wall 162.

Figure 5:
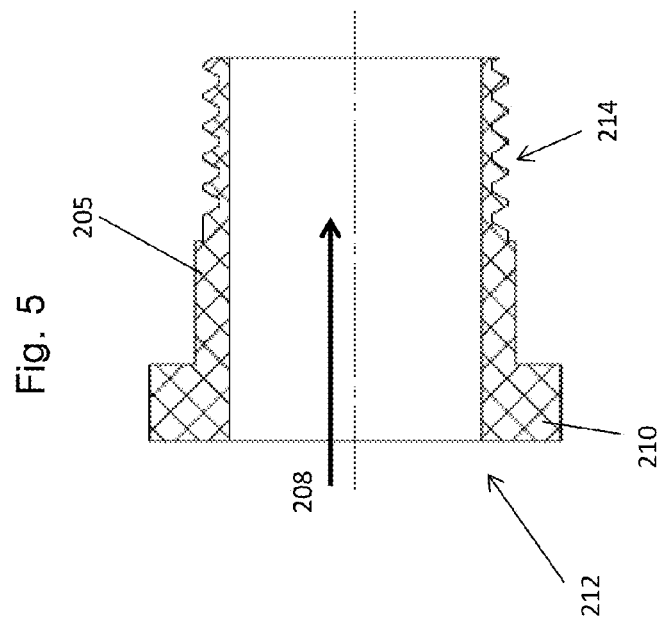
FIG. 5 is a cross-sectional view of the embodiment of the cap member taken along line 5-5 of FIG. 4.
Figure 4:
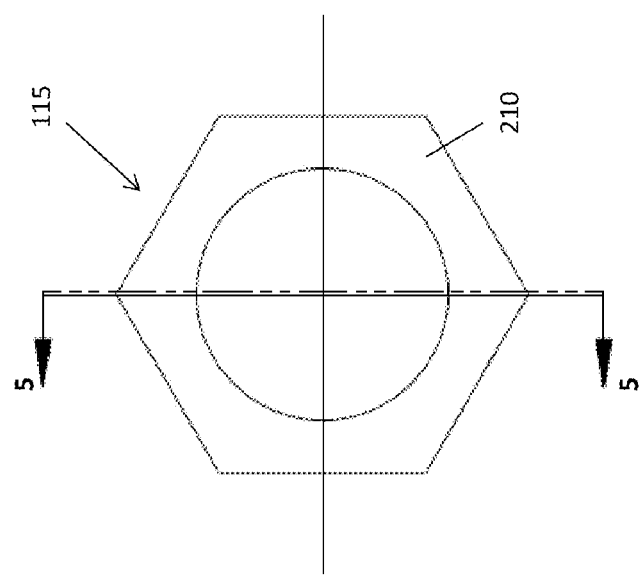
FIG. 4 is a top plan view of a cap member in accordance with one embodiment of the present invention.

As shown in FIGS. 2, 4 and 5, a chamber cap 115 is provided in the form of a substantially cylindrical-shaped body 205 having a cavity 208 extending axially therethrough with a head portion 210 at one end 212 of the body 205. The head portion 210 can be of any shape that can be manipulated for clockwise and counter-clockwise rotation, and is shown in FIG. 4 in a hexagonal shape. The body portion 205 is provided with an external thread 214 for mating with the internal thread 110 of the chamber body component 20.

Figure 1:
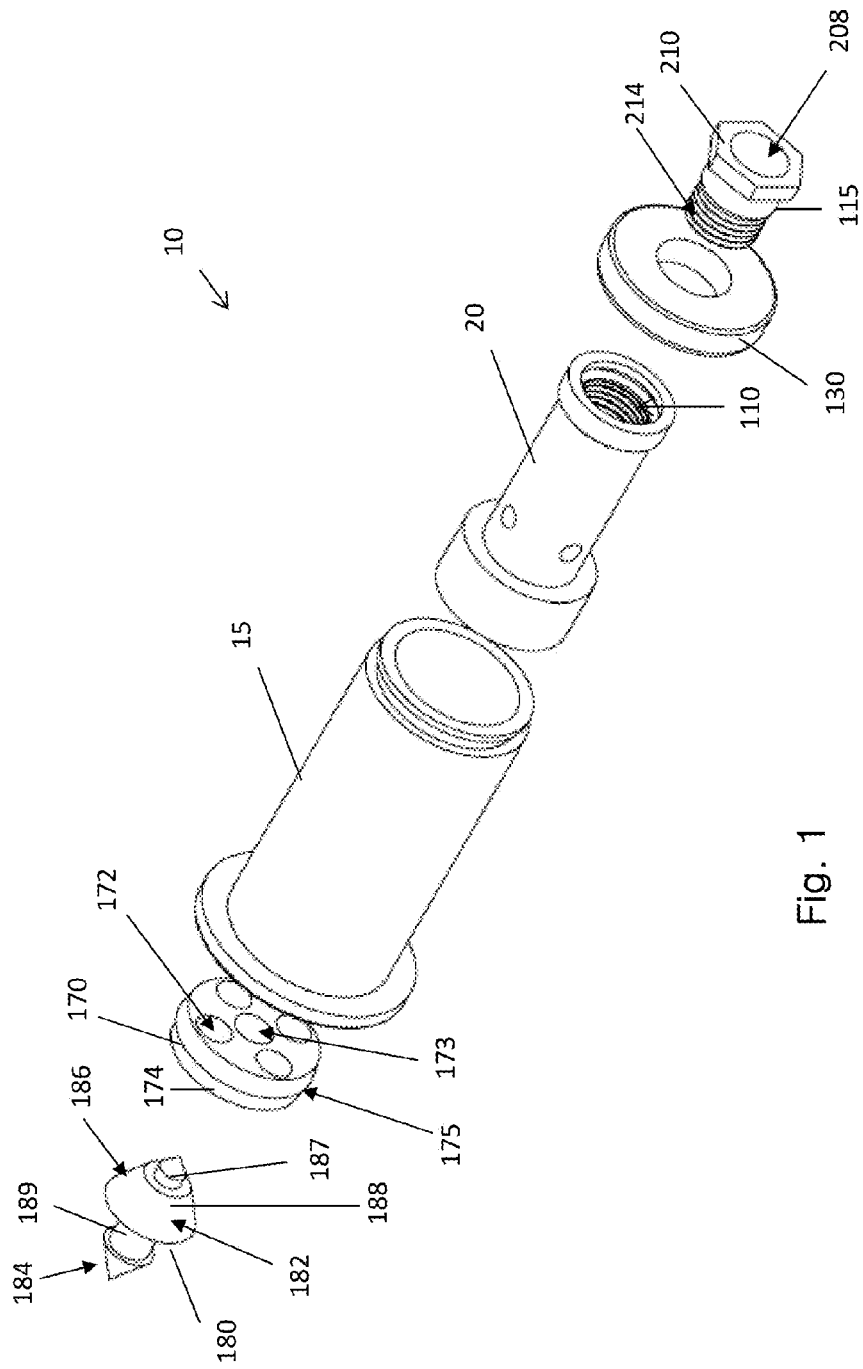
FIG. 1 is an exploded front perspective view of one embodiment of the valve assembly of the present invention.

In one embodiment of the present invention as shown in FIGS. 1, 2 and 11, a fluid control plate 170 is designed with one or more fluid control plate flow ports 172 to allow fluid to flow therethrough. The fluid control plate 170 can receive a flow restrictor 180 extending through a central axial opening 173 of the plate, and the flow restrictor 180 thereby extends axially inwardly and into the first portion 61 of the cavity of the main body component 15. In one embodiment of the present invention, the flow restrictor 180 includes a flood stop control seal or plunger seal 182 that assists in sealing the fluid flow during operation of the device, when required. As shown in FIGS. 1, 2 and 11, the control seal 182 can have a wider flow-facing end 186 tapered to a narrower downstream end 184. The outer edge 188 of the flow-facing end 186 of the control seal 180 is adapted to mate with the bevel wall 128 of the chamber body component 20 in substantially flush relation during operation if and when the valve is positioned in shut-off position. The flow restrictor 180 includes a neck portion 189 that securely fits within central axial opening 173 of the plate, as shown in FIGS. 1 and 11. The edge 175 of the fluid control plate 170 can be considered a stabilizer edge and wall 174 can be considered a snap slope edge in that the fluid control plate can snap into position within the main body component 15 as a result of the tapered surface element 62 in the main body member inner wall 24, as shown in FIG. 11. In one embodiment of the present invention, the fluid control plate 170 and the flow restrictor 180 with flood stop control seal 182 are separate components, with the flow restrictor 180 being insertable and retainable within fluid control plate 170 by pushing downstream end 184 through the central axial opening 173 of the fluid control plate 170. An upstream central plug element 189 of the flow restrictor 180 is also provided and can assist with restricting fluid flow during operation as the chamber body component 20 is pushed towards the flow restrictor 180, as the ring extension 124 surpasses and encircles the plug element 189 if fluid flow exceeds allowed rates, as described in connection with the operation of the invention elsewhere herein. In one embodiment of the present invention, the fluid control plate 170 can be formed of a polymeric material such as polyoxymethylene (POM) and the flow restrictor 180 with flood stop control seal 182 can be formed of EPDM rubber (ethylene propylene diene monomer (M-class) rubber) material. Similarly, the gland member 130 described herein can be formed of EPDM rubber, for example, or similar elastomeric material, in accordance with one embodiment of the present invention.

With regard to a method of assembly of the valve device of the present invention, the chamber body component 20 is inserted through an opening 190 at the first axial end 28 of the main body component 15, and the fluid control plate 170 with flow restrictor 180 and flood stop control seal 182 is inserted and secured into the cap portion 26 of the main body component 15. The gland member 130 is secured to the main body component 15 and the chamber body component 120 such that the external 140 and internal 142 lips of the gland member 130 securely engage the annular grooves 52, 100 described above. The chamber cap 115 is then inserted through the gland member 130 such that the external thread 214 on the chamber cap 115 securely engages the internal thread 110 on the chamber body component 20.

In operation, fluid such as water enters from a piping or tubing element (not shown) into the valve assembly 10 of the present invention from the first axial end of the main body component 15. It will be appreciated that the fluid can be liquid or gas, and will further be appreciated that the specific gravity of the fluid is inconsequential to the operation of the present invention. The fluid enters at a fluid rate measured, for example, in gallons per minute. If the fluid flow maintains the desired rate (e.g., 2.4 gallons per minute), the valve assembly 10 is unaffected and permits free flow through the cavity of the chamber body component 20 and past the flow stop control seal 182 and through the ports 172 in the fluid control plate 170. If the incoming fluid flow increases, fluid pressure will build up outside of the chamber body component 20 and will extend around the end of the chamber body component (for example, in the areas 250 around the head portion 205 of the chamber cap 115) to push the chamber cap 115 towards the fluid control plate end of the assembly. In this process, the chamber body component 20 will come closer to the fluid sealing member 182, and the gland member 130 will stretch to permit the extension of the chamber body component. Additionally, propulsion ports 75 will move from a position where they permit fluid to evacuate the chamber body member into channels 255 in FIG. 11 alongside chamber body component 20, to where they permit fluid to evacuate the chamber body member 20 in the positive displacement cavity 59 and first portion 61 of the chamber of the main body component 15 beyond the rampart member 55 of the main body member 15. The propulsion ports 75 thus facilitate some evacuation of fluid from the chamber body member 20, but ultimately allow the fluid to continue building up and pushing the chamber body member 20 towards the fluid control seal 182, since the positive displacement cavity 59 is relatively small, and the chamber body member will be pushed by fluid within cavity 61 as the fluid pressure builds up against chamber head portion 80. It will be appreciated that some balancing fluid flow may occur through slender channels 193, 195 shown in FIG. 11, assisting with back pressure for the device.

When the fluid flow is so great that the fluid control seal 182 seals against the seal engaging bevel edge 128 of the chamber body component 20, no more fluid can exit through the fluid control plate 170. Once the flow rate is reduced externally (e.g., from the incoming area 250 in FIG. 11), the pressure on the chamber body component 20 is relaxed, and the chamber body component is returned via pressure from the gland member 130 away from the fluid control seal 182.

It will be appreciated that the present invention requires no spring, and no sealing ring or O-ring type device in order to facilitate movement of adjacent components in valve devices. Further, the present invention can be provided in a form factor that is significantly smaller than that of other devices. In one embodiment of the present invention, the length of the device when assembled is no greater than 1.25 inches. It will further be appreciated that the present invention is versatile and can be employed with fluids and gases of various types. In one embodiment, the device of the present invention can be employed in environments where fluid flow rates range up to 150 gallons per minute or more, or where air pressure is 250 pounds per square inch or more. As sealing rings can build up frictional pressure and heat over time, they can wear down. Additionally, an oil or silicon impregnated seal can suffer from lower tolerances to high pressure and heat, or may potentially ignite or explode at higher temperatures and/or pressures. As the present invention does not employ such seals, it can bear higher temperatures, flow rates and pressures accordingly. Further, as the present invention does not employ steel or other metal, such as might be present in a spring, for example, the present invention is further able to bear higher temperatures, flow rates and pressures.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A valve assembly, comprising:
 a substantially cylindrical-shaped main body component having a first end, a second end and an inner wall defining a cavity extending axially through the main body component, with the inner wall further having a rampart member extending radially inwardly therefrom;
 a substantially cylindrical-shaped chamber body component having a first end, a second end and an inner wall defining a cavity extending axially through the chamber body component, with the chamber body component having an outer wall that is slidably engageable with the rampart member;
 a fluid control plate securably attachable to the first end of the main body component;
 a resilient, hollow gland member securably attachable to the second end of the main body component and the second end of the chamber body component; and
 a hollow chamber cap secured to the second end of the chamber body component.

2. The valve assembly of claim 1, wherein the rampart member includes a first side wall, a second side wall and an interior edge, wherein the chamber body outer wall is slidably engageable with the interior edge, and wherein the second side wall and the chamber body outer wall form a positive displacement cavity.

3. The valve assembly of claim 1 wherein the fluid control plate includes a flood stop control seal extending axially inwardly of the fluid control plate and within the main body component cavity.

4. The valve assembly of claim 1 wherein the rampart member divides the main body component cavity into a first portion and a second portion, and wherein the chamber body component includes a head member capable of axial movement within the first portion of the main body component cavity.

5. The valve assembly of claim 4 wherein the radius of the first portion of the main body component cavity is greater than the radius of the second portion of the main body component cavity.

6. The valve assembly of claim 1 wherein the fluid control plate includes a flood stop control seal extending axially inwardly of the fluid control plate and within the main body component cavity, wherein the chamber body component includes a head member capable of axial movement within the main body component cavity, and wherein the head member includes a bevel edge adapted to engage the flood stop control seal in substantially flush relation.

7. The valve assembly of claim 1 wherein the chamber body component includes at least one propulsion port extending radially therethrough.

8. The valve assembly of claim 1 wherein the chamber body component inner wall includes an internally threaded surface proximate the chamber body component second end.

9. The valve assembly of claim 1 wherein the cap member includes a body portion with an externally threaded surface.

10. The valve assembly of claim 1 wherein the chamber body component second end includes an external body wall, an outer radial wall and an outer axial wall, wherein the outer radial wall includes an inner face and an outer face, the outer axial wall includes an inner face, an outer face and a radial internal edge, and wherein the outer radial wall inner face, the outer axial wall inner face and the first external body wall form a chamber body component annular groove.

11. The valve assembly of claim 1 wherein the main body component second end includes a radially outwardly extending retaining edge having an external face, an outer edge and an inner face, and wherein the main body component second end further includes a grooved edge portion having an outer wall and a body portion side wall, such that the grooved edge portion outer wall, body portion side wall and the retaining edge inner face form a main body component annular groove.

12. The valve assembly of claim 1 wherein the gland member includes a radially outer wall, a radially inner wall, an exterior wall and an interior face having a substantially C-shaped cross-section.

13. The valve assembly of claim 12 wherein the gland member interior face includes exterior and interior lip elements.

14. The valve assembly of claim 13 wherein the main body component second end includes an annular groove and the chamber body component second end includes an annular groove, and further wherein the exterior lip element of the gland member cooperatively engages the main body component annular groove and the interior lip element of the gland member cooperatively engages the chamber body component annular groove.

15. A method for providing a valve assembly, comprising:
providing a substantially cylindrical-shaped main body component having a first end, a second end and an inner wall defining a cavity extending axially through the main body component, with the inner wall further having a rampart member extending radially inwardly therefrom;
inserting a substantially cylindrical-shaped chamber body component into the main body component, the chamber body component having a first end, a second end and an inner wall defining a cavity extending axially through the chamber body component, with the chamber body component having an outer wall that is slidably engageable with the rampart member;
securing a fluid control plate to the first end of the main body component;
securing a resilient, hollow gland member to the second end of the main body component and the second end of the chamber body component; and
securing a hollow chamber cap to the second end of the chamber body component.

16. The method of claim 15, wherein the rampart member includes a first side wall, a second side wall and an interior edge, wherein the chamber body outer wall is slidably engageable with the interior edge, and wherein the second side wall and the chamber body outer wall form a positive displacement cavity.

17. The method of claim 15 wherein the rampart member divides the main body component cavity into a first portion and a second portion, and wherein the chamber body component includes a head member capable of axial movement within the first portion of the main body component cavity.

18. The method of claim 17 wherein the radius of the first portion of the main body component cavity is greater than the radius of the second portion of the main body component cavity.

19. The method of claim 15 wherein the chamber body component includes at least one propulsion port extending radially therethrough.

20. A valve assembly, comprising:
a substantially cylindrical-shaped main body component having a first end, a second end and an inner wall defining a cavity extending axially through the main body component;
a substantially cylindrical-shaped chamber body component having a first end, a second end and an inner wall defining a cavity extending axially through the chamber body component, with the chamber body component having an outer wall that is slidably maintained within the main body component cavity; and
a resilient, hollow gland member securably attachable to the second end of the main body component and the second end of the chamber body component.

* * * * *